United States Patent
Bonacci

[19]
[11] Patent Number: 6,059,408
[45] Date of Patent: May 9, 2000

[54] SNUG FITTING FLOATING EYEGLASSES

[76] Inventor: Thomas A. Bonacci, 2047 Calvert Ave., Costa Mesa, Calif. 92626

[21] Appl. No.: 09/352,151

[22] Filed: Jul. 13, 1999

[51] Int. Cl.[7] ................................................ G02C 1/00
[52] U.S. Cl. ............................................ 351/43; 351/62
[58] Field of Search ............................. 351/43, 41, 158, 351/111, 121, 62, 156

[56] References Cited

U.S. PATENT DOCUMENTS

| | | |
|---|---|---|
| D. 299,034 | 12/1988 | Seaboyer . |
| D. 336,098 | 6/1993 | Evans . |
| D. 362,011 | 9/1995 | Kolentsi . |
| 4,934,807 | 6/1990 | Boll'e et al. . |
| 5,319,396 | 6/1994 | Cesarczyk . |
| 5,488,441 | 1/1996 | Pomatti ................... 351/156 |
| 5,495,303 | 2/1996 | Kolentsi . |

FOREIGN PATENT DOCUMENTS 829813  7/1949  Germany ............................ 351/43

*Primary Examiner*—Hung Xuan Dang
*Attorney, Agent, or Firm*—Gordon K. Anderson

[57] ABSTRACT

Floating eyeglasses having a frame (20) with lenses (22), a bridge (24) and ends (26), preferably of the wrap around type fabricated of thermoplastic, are modified to include elements that permit the eyeglasses to float. Temples (30) are pivotally attached to the frame and include a inwardly curved smooth surface (36). A number of frame float pads (38–44) are attached to the frame adjacent to hinges that connect the temples. A pair of temple float pads (52) and (54) are attached to the curved surface of the temples. The combined frame and temple float pads have sufficient buoyancy to overcome the weight of the frame and temples permitting the eyeglasses to float in water with the temples always in an upright position.

20 Claims, 4 Drawing Sheets

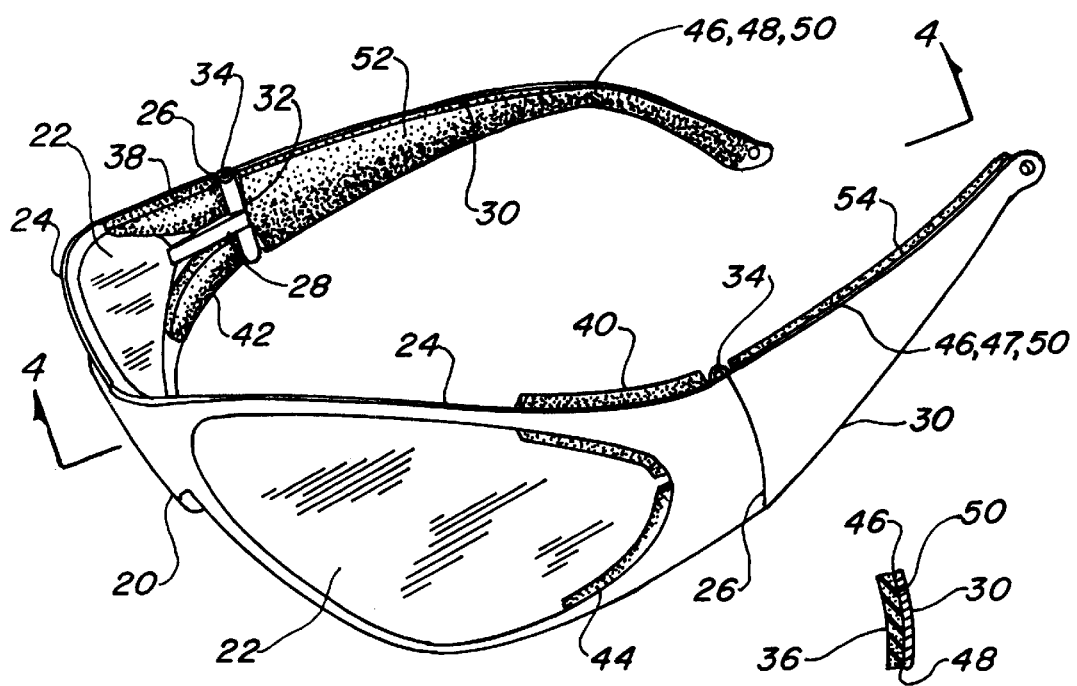
FIG. 1
FIG. 3
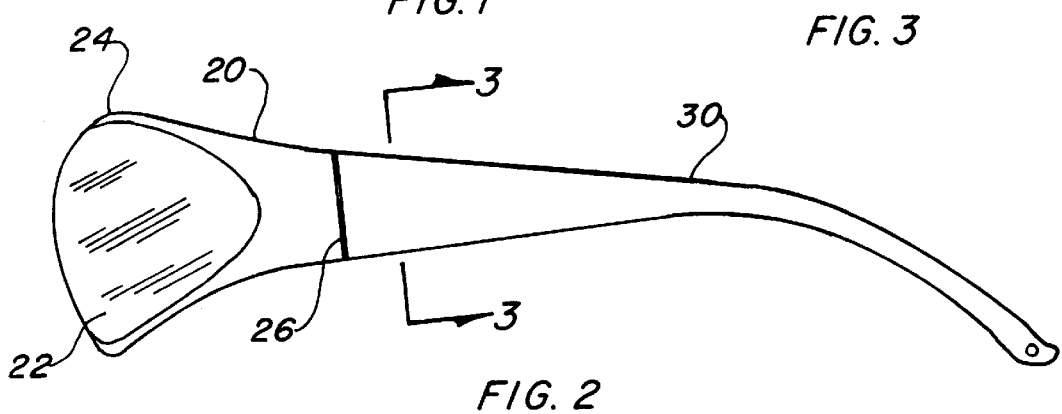
FIG. 2
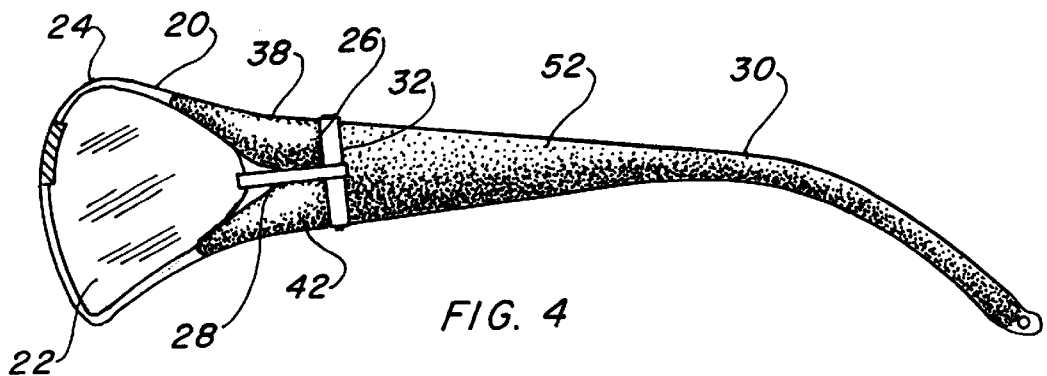
FIG. 4

SNUG FITTING FLOATING EYEGLASSES

TECHNICAL FIELD

The present invention relates to eye wear in general. More specifically to sunglasses or clear lens glasses that float in the water.

BACKGROUND ART

Previously, many types of sunglasses or devices to hold sunglasses have been developed in endeavoring to provide an effective means to prevent loss in the water. Prior art has employed adding a material to the glasses having a specific gravity of less than one when combined with the eyeglasses causing them to float. In most cases the material has been added to the frame along the brow either permanently or in a removable manner to accommodate these desired characteristics. Others have simply employed devices that attach to conventional glasses, either to the ends of the temples or completely encase the glasses with a floatable material.

A search of the prior art did not disclose any patents that read directly on the claims of the instant invention, however the following U.S. patents are considered related:

| U.S. Pat. No. | Inventor | Issue Date |
| --- | --- | --- |
| 5,495,303 | Kolentsi | Feb. 27, 1996 |
| 5,319,396 | Cesarczyk | Jun. 7, 1994 |
| 4,934,807 | Boll'e et al. | Jun. 19, 1990 |
| Des. 362,011 | Kolentsi | Sep. 5, 1995 |
| Des. 336,098 | Evans | Jun. 1, 1993 |
| Des. 299,034 | Seaboyer | Dec. 20, 1988 |

Kolentsi in U.S. Pat. No. 5,495,303 teaches eyeglasses that float due to the addition of a foam member added into a flange integrally formed into the top transverse frame member. The frame forms the front face of the eyeglasses and is curved rearwardly following the curvature of a wearer's face. A single transparent or translucent convex lens is secured to the frame by being located in a slot present in the underside of the frame. A flange is formed on the interior side of the frame and a foam cushion/floatation strip is imbedded into the flange for attachment and to prevent natural loss of attaching adhesive on hot days. The buoyancy of the foam member is greater than the weight of the eyewear permitting the glasses to float.

U.S. Pat. No. 5,319,396 issued to Cesarczyk is for eyeglasses and goggles that have a shield member attached to the frame, with the shield having tapered ends. A plastic foam member is configured to fit into a groove in the shield. During use this plastic member is held in place snugly against a wearers face on the brow to prevent perspiration from falling into ones eyes.

U.S. Pat. No. 4,934,807 issued to Boll'e et al. teaches sunglasses having a detachable absorber strip. The sunglasses utilized have a replaceable convex pane curved both horizontally and vertically. An absorber strip, utilizing a sponge material, is removably attached to the frame of the glasses and the glasses include interchangeable temple members for fit and comfort.

Design U.S. Pat. No. 362,011 of Kolentsi discloses the design of floating eyeglasses having the same appearance as the subsequent U.S. Pat. No. 5,494,303 issued to the same inventor at a later date.

U.S. Pat. No. Des.336,098 of Evans is for the ornamental design of an eyeglass holder that is made of a material that floats in water with sufficient buoyancy to permit eyeglasses attached thereunto to also float.

Seaboyer in U.S. Pat. Des. 299,034 teaches the ornamental design of sunglasses formed with a single wrap around lens and apparently an adjustable head band with a elongated portion that circumvents the wearers head.

DISCLOSURE OF THE INVENTION

Eye wear of any type used for outdoor activities, particularly sun glasses that are worn in sports that include speed and accelerated movements, obviously become venerable to breakage and loss. This fact is particularly evident in water sports using engine powered equipment such as jet skis and power boats pulling water skiers where a fall easily leads to loosing ones glasses in the water due to the normally encountered impact of falling. It is therefore a primary object of the invention to have eye protection that allows detection and subsequent recovery when a typically inevitable loss occurs. The invention utilizes a series of float pads attached at strategic points upon a pair of wrap around polycarbonate glasses. This location and thickness of the closed cell foam sponge pads not only permits the glasses to float but always in the same direction, which is with the lenses down and the temples prominently protruding in a upward position above the water. The glasses ire balanced to right themselves when entering the water from any orientation which allows the wearer to look for a obvious pair of temples elevated in an upward direction.

An important object of the invention related to the above ease of locating the glasses when lost in the water, is realized in that the float pads are colored with a white marble pattern that is easily distinguished from the uniform hue of the water. This distinct pattern is visually contrasted from its surroundings making identification much easier in most circumstances.

Another object of the invention is directed to the positioning of the float pads around the edge of wearers brow and temple area. This location obstructs and protects this region from eddy currents created by the velocity of the wind impinging on this area. In contrast, conventionally configured glasses are adversely effected by the wind. A tight fit is achieved with the instant invention as the foam is resilient and easily conforms to the contour of the users face completely sealing this potential anomaly that may cause loss of the eye wear when wind or vehicle speed is encountered. Loss of glasses is particularly a concern when riding a motor vehicle such as a open automobile, boat, motorcycle and the like, when the rider or driver turns his or her head to look to the rear. In this circumstance the wind catches this vulnerable area and blows the glasses from the face. This is apparent by observing someone in this type of situation when the person actually holds the glasses in place with the finger or hand while turning to look to the rear.

Still another object of the invention relating to the location of the frame float pads is that sufficient space is left to prevent or at least minimize fogging of the lenses. In glasses that touch both the forehead and cheeks, the elevated temperatures and evaporating perspiration has a tendency to collect on the lenses fogging them to the extent that vision is impaired, particularly when the glasses are initially brought into use. It has been found that in comparing similar glasses, the float pads greatly ameliorate this phenomena as air is permitted to flow freely and circulate around the lenses, whereas prior art using sponge material on the brow or glasses that are tight fitting on top and bottom completely impede the air flow.

Yet another object of the invention is realized by increasing user comfort when wearing the improved eye glasses by the addition of resilient temple pads. The pads not only increase wearer comfort due to its pliant nature but also helps keep the glasses from sliding off of ones face. It may be noted that almost all eyeglasses have the tendency to slip down on the nose when the wearer is hot and perspiration is present however since the temples are completely covered with a material that conforms to the contour of the head and is essentially springy it permits a greater degree of permanence. Comfort is realized in not only outdoor usage but when the eyeglasses have clear lenses and are the safety type, as preferred in the invention, particularly the type ANSI.Z87. 1 approved by the American National Standard Institute, factory workers find this added resiliency along with the advantages noted above are extremely beneficial to the user.

A further object of the invention relative to the temple pads, is that when the glasses are temporarily removed from ones face and placed around the neck or on top of the head they are much easier to be retained for the same reasons as described above.

A final object of the invention is that the eyeglass temples are formed in a convex longitudinal shape. This configuration does not detract from the structural integrity of the member in any way however it does provide a optimum surface for mounting float pads in comparison with the angular surface encountered in many conventional glasses.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the preferred embodiment.

FIG. 2 is a left side view of the preferred embodiment.

FIG. 3 is a cross sectional view taken along lines 3—3 of FIG. 2.

FIG. 4 is a cross sectional view taken along lines 4—4 of FIG. 1.

BEST MODE FOR CARRYING OUT THE INVENTION

Figure 5:
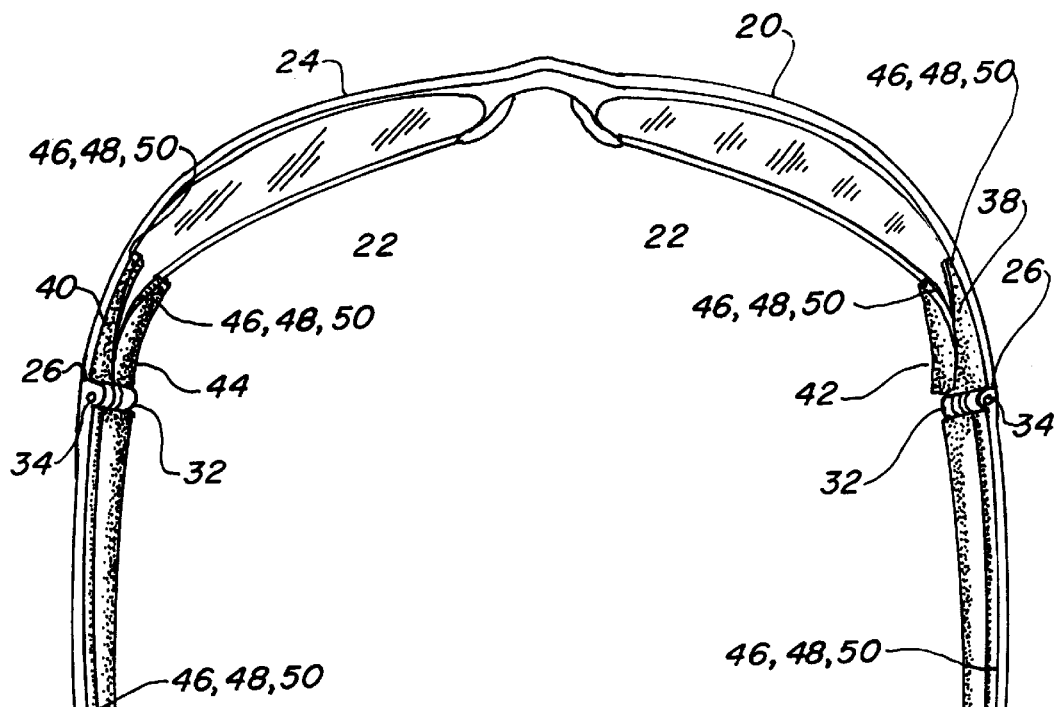
FIG. 5 is a top view of the preferred embodiment.
Figure 6:
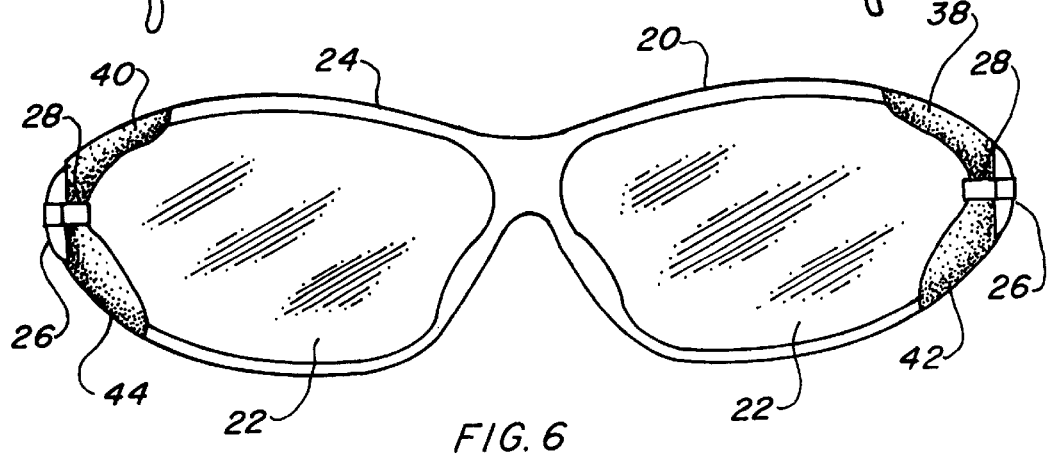
FIG. 6 is a view of the inside surface of the eyeglass frame less the temples, illustrating the frame float pads attached upon the inside surface of the frame.

The best mode for carrying out the invention is presented in terms of a preferred embodiment. This preferred embodyment is shown in FIGS. 1 through 20 and is comprised of an eyeglass frame 20 that includes a pair of lenses 22 and a bridge 24 across the top with ends 26 on each outside edge. Each of the frame ends 26 have temple receiving hinge means in the form of a single gusseted knuckle 28 integrally formed with the frame 20 adjacent to each end 26. A pair of spatula type side temples 30 each having at least two integrally formed aligned temple hinge knuckles 32 engage each single gusseted knuckle 28 therebetween. The temple hinge knuckles 32 therefore align on either side of the gusseted knuckle 28 forming a continuous hinge. The temples 30 have a interfacing width equal to the width of the bridge ends 26 permitting the glasses to have a uninterrupted breadth from the frame to the temples as shown in FIG. 1 and 2.

The side temples 30 are connected to the frame 20 each with a hinge pin 34, well known in the art, permitting the temples to pivot inwardly for storage when not in use. The eyeglasses are the so-called wrap-around type with the frame 20 covering a wearers brow, cheekbone and a portion of the ones temples. The glasses are preferably made of optically clear polycarbonate thermoplastic with the lenses 22 integrally formed with the frame 20. It will be noted that the eye glasses thus described are basically the same in structure as conventional eyeglasses however in order for them to receive suitable floatation elements the temples 30 are inwardly curved 36 as illustrated in FIG. 3 in a smooth convex radial manner on the side next to the wearer. Preferably the thickness of the temples 30 is substantially uniform throughout as shown best in FIG. 5.

In order to permit the eyeglasses to float in water, a number of frame float pads are attached the frame adjacent to the hinge means as shown in FIGS. 1, 3, 4–8, 11–14 and 17–20. The float pads are best described as individually shaped members located at strategic positions on the frame 20 adjacent to but not covering the lenses. A top right frame float pad 38 and a top left frame float pad 40 are in mirror images of each other. A bottom right frame float pad 42 and a bottom left frame float pad 44 complete the set and are likewise in mirror images of one another. Each of the frame pads are attached to the frame 20 in an area essentially adjacent to the frame ends 26 and both on top of and below the single gusseted knuckle 28 as illustrated in FIGS. 1, 4 and 6–8. Tie frame float pads are made of closed cell foam sponge preferably of ethylene vinyl acetate material having a density of from 11 pounds per cubic foot (176.2 kilograms per cubic meter) to 13 pounds per cubic foot (208.2 kilograms per cubic meter), with 12 pounds per cubic foot (192.2 kilograms per cubic meter) preferred. The color is of little importance as the glasses float with the frame pads under the water however gray is a common color in this material.

The pads have a pressure sensitive backing 46 which is an acrylic based peel and stick adhesive however any other acceptable substance may be used with equal ease. The pads have a thickness of from 4 millimeters to 7 millimeters and it has been found that a thickness of either 5 or 6 millimeters is optimum for achieving the best floatation effect. The frame pads 36–44 are attached to the frame 20 with a contact cement 48 after the frame has been prepared with a priming solution to clean the surface of the frame and create a acceptable texture. Through experimentation it has been found that the 3M product Number 943M is ideal for cleaning and the cement is a Cemtrec product designated as Permagrip 56500 which functions exceptionally well for the application as it is impervious to water after curing. When united with the pressure sensitive backing the combination creates an almost permanent bond.

The pads are shown completely removed from the invention in FIGS. 11–14 and 17–20 and the cement 48 along with the primed surface 50 using the priming solution described above is identified by numerical reference in FIGS. 1, 3 and 5. It may be plainly seen that the shape of the pads follows the contour of the frame 20 in every respect in the areas shown and rest against the gusseted knuckle 28 both on the top and the bottom. While the configuration of the pads are depicted in a very specific manner in the drawings for the wrap around type eye wear, other shapes function equally well on different styles of frames as long as sufficient area is available.

Figure 7:
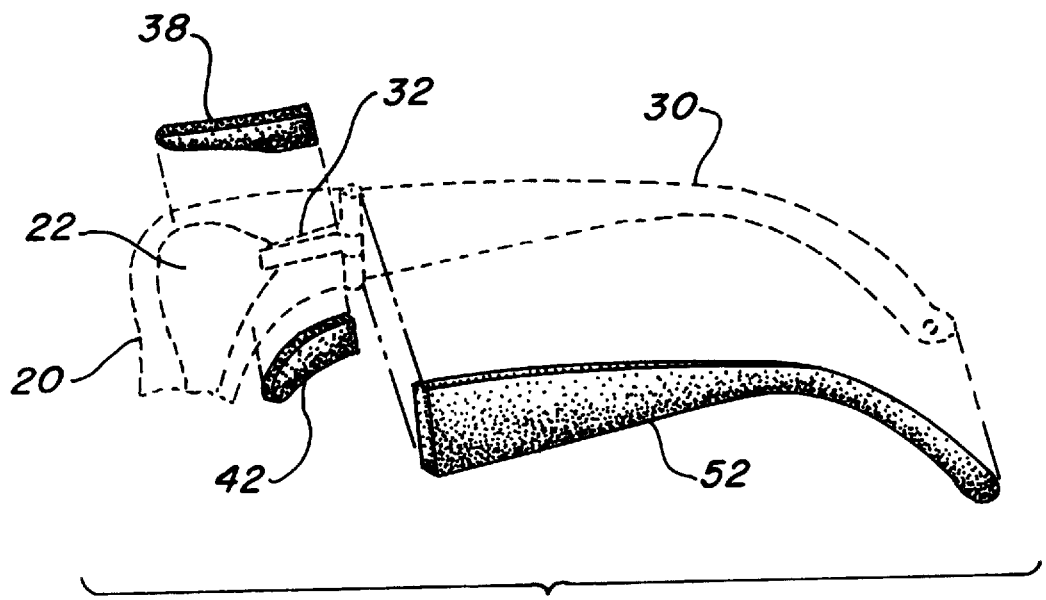
FIG. 7 is an exploded view of the right frame top and bottom float pads and the right temple float pad with a portion of the frame and temple shown in dotted lines to indicate attachment location.
Figure 8:
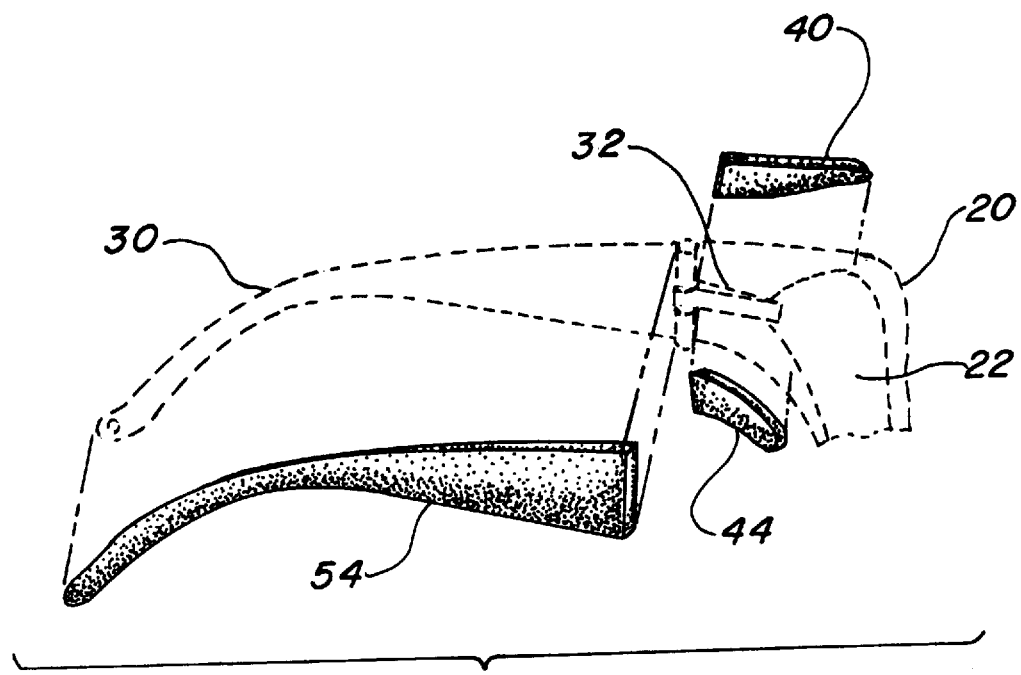
FIG. 8 is an exploded view of the left frame top and bottom float pads and the left temple float pad with a portion of the frame and temple shown in dotted lines to indicate attachment location.
Figures 9, 10:
FIG. 9 is a front view of the right temple float pad completely removed from the invention for clarity. This figure illustrates the pad with a marbled black and white color however it should be noted that the preferred marbling design is of a random nature and no two pads are exactly alike therefore this view is only representative of the pattern.
FIG. 10 is a side view of the right temple float pad completely removed from the invention for clarity.
Figures 11, 12, 13, 14:
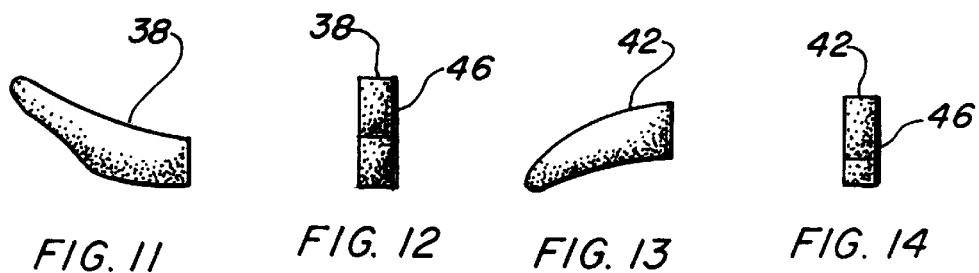
FIG. 11 is a front view of the top right frame float pad completely removed from the invention for clarity.
FIG. 12 is a side view of the top right frame float pad completely removed from the invention for clarity.
FIG. 13 is a front view of the bottom right frame float pad completely removed from the invention for clarity.
FIG. 14 is a side view of the bottom right frame float pad completely removed from the invention for clarity.
Figures 15, 16:
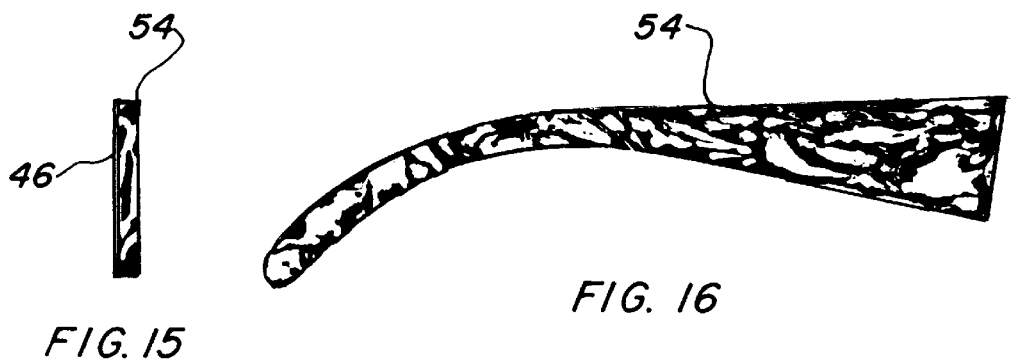
FIG. 15 is a side view of the left temple float pad completely removed from the invention for clarity.
FIG. 16 is a front view of the left temple float pad completely removed from the invention for clarity, including the representative marbling color as described in detail in the description of FIG. 9.
Figures 17, 18, 19, 20:
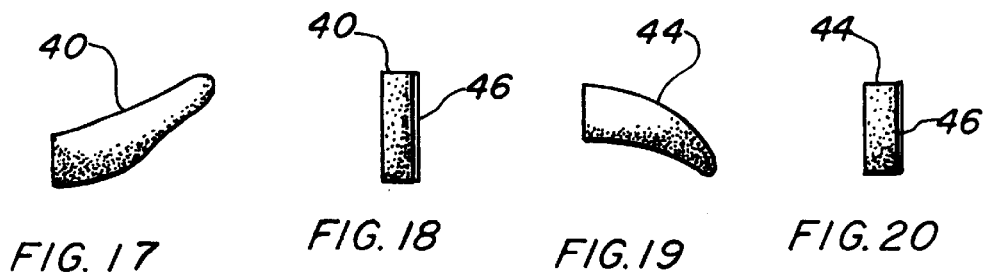
FIG. 17 is a front view of the top left frame float pad completely removed from the invention for clarity.
FIG. 18 is a side view of the top left frame float pad completely removed from the invention for clarity.
FIG. 19 is a front view of the bottom left frame float pad completely removed from the invention for clarity.
FIG. 20 is a side view of the bottom left frame float pad completely removed from the invention for clarity.

Temple float pads are attached to the entire inside surface of the temples 30 such that the combined frame float pads and the temple float pads have sufficient buoyancy to overcome the weight of the frame 20 and the temples 30 permitting the eyeglasses to float in water. In order to have the absolute optimum mounting surface for the float pads on the temples 30 each temple is inwardly curved 36 in a smooth convex radial manner as previously described and depicted in FIG. 3. The temple float pads consist of a right temple float pad 52 and a left temple float pad 54 each in mirror image of the other. The material for the temple pads is basically the same as the frame pads utilizing a closed cell foam sponge preferably of ethylene vinyl acetate material having a density of from 11 pounds per cubic foot (176.2 kilograms per cubic meter) to 13 pounds per cubic foot (208.2 kilograms per cubic meter), with 12 pounds per cubic foot (192.2 kilograms per cubic meter) preferred. The thickness of material differs from the frame pads with the temple pads having a thickness of from 1 millimeter to 3 millimeters with 1.5 or 2 millimeters achieving the best floatation effect. The temple pads are attached to the temples using the identical material and preparation as the frame pads as described previously. It will be noted that the inwardly curved shape of the temples 30 not only provides an enhanced area for purchase of the pads with the adhesive 46 and cement 48 but protects the pads from wear on the entire surface as only the edges protrude. Further the shape lends itself to grip the users head in a more positive manner. While the material of the temple pads normally has a uniform smooth surface, the ends near the wearers ears may be textured to have a irregular or rough feel that reduces slippage particularly when perspiration is involved. This textured surface may also cover the entire exposed area as depicted in FIGS. 7 and 8 for the same reasons, with equal ease and either configuration will bee within the inventions scope.

The color of the temple float pads 52 and 54 is important in that it leads to identification when in the glasses are in the water, therefore, a white background with a contrasting dark, preferably black, marble effect is easily identified as it differs in not only color but in contrast. FIGS. 9, 10, 15 and 16 illustrate this preferred coloring effect however it must be realized that the design is only representative since the marbling with the dark coloring on the white background is achieved during the manufacture process each batch is different and unique in and of itself. Further any single color, combination of colors or design may be equally well utilized in the invention as an example, a marbled fluorescent pink and purple or any emergency color such as fluorescent yellow, red etc. even a uniform design like stripes, dots, checks, repetitive individual figures or almost any design arrangement and combination may be acceptable.

While the invention has been described in complete detail and pictorially shown in the accompanying drawings, it is not to be limited to such details, since many changes and modifications may be made in the invention without departing from the spirit and scope thereof. Hence, it is described to cover any and all modifications and forms which may come within the language and scope of the appended claims.

What is claimed is:

1. Floating eyeglasses comprising:
    a frame having a bridge with ends and a pair of lenses therein also temple receiving hinge means integrally formed into each end,
    a pair of spatula side temples having a plurality of integral hinge knuckles contiguously engaging said hinge means and each temple having an interfacing width coequal to the ends of the frame,
    a hinge pin connecting each side temple to the frame in a pivotal manner,
    a plurality of frame float pads attached to the frame adjacent to the hinge means, and
    a temple float pad attached to each side temple such that the combined frame and temple float pads have sufficient buoyancy to overcome weight of the frame and temples permitting the eyeglasses to float in water.

2. The Floating eyeglasses as recited in claim 1 wherein said frame is the wrap around type with the lenses covering a wearers brow, cheekbone and a portion of ones temples.

3. The Floating eyeglasses as recited in claim 1 wherein said frame is optically clear polycarbonate thermoplastic and said lenses are integrally formed with the frame.

4. The Floating eyeglasses as recited in claim 1 wherein said hinge means are defined as a single gusseted knuckle integrally formed adjacent to each end of the frame and each side temple comprises a pair of aligned temple hinge knuckles each integral with the end of the temple such that each temple knuckle aligns on either side of said gusseted knuckle with said pins disposed through all of the knuckles permitting each temple to be pivotally attached to the frame.

5. The floating eyeglasses as recited in claim 1 wherein each side temple is inwardly curved in a smooth convex radial manner on a side next to a wearer, further, having a substantially uniform thickness throughout.

6. The Floating eyeglasses as recited in claim 1 wherein said frame float pads further comprising a top right frame float pad, a top left frame float pad, a bottom right frame float pad and a bottom left frame float pad each configured to be attached to the frame in an area essentially adjacent to the frame ends and on top of and below a bottom of the temple receiving hinge means.

7. The floating eyeglasses as recited in claim 1 wherein said temple float pads further comprising a right temple float pad covering an entire inside surface of a first one of the temples and a left temple float pad covering an entire inside surface of a second one of the temples, each float pad in mirror image of the other.

8. The Floating eyeglasses as recited in claim 1 wherein said frame float pads and temple float pads further comprising a closed cell foam sponge with pressure sensitive adhesive backing.

9. The Floating eyeglasses as recited in claim 8 wherein said frame and temple float pad closed cell foam sponge has a density of from 11 pounds per cubic foot (176.2 kilograms per cubic meter) to 13 pounds per cubic foot (208.2 kilograms per cubic meter).

10. The Floating eyeglasses as recited in claim 8 wherein said frame float pads closed cell foam sponge is from 4 millimeters to 7 millimeters thick.

11. The Floating eyeglasses as recited in claim 8 wherein said temple float pads closed cell foam sponge is from 1 millimeter to 3 millimeters thick.

12. The Floating eyeglasses as recited in claim 1 wherein said frame float pads and temple float pads are attached to the frame and temples with contact cement on a primed surface.

13. The Floating eyeglasses as recited in claim 1 wherein said temple float pads are white with a contrasting dark marbled color.

14. The Floating eyeglasses as recited in claim 1 wherein said temple float pads have a textured surface on a surface contiguous with a wearer for creating a non-slip grip.

15. Floating eyeglasses comprising:
   a frame with a bridge with ends and a pair of optically clear lenses therein,
   a pair of side temples having an interfacing width coequal to the ends of the frame,
   a hinge connecting said frame onto each side temple in a pivotal manner,
   a plurality of frame float pads attached to the frame adjacent to the hinge, and
   a temple float pad attached to each side temple such that the combined frame and temple float pads have sufficient buoyancy to overcome weight of the frame and temples permitting the eyeglasses to float in water.

16. The Floating eyeglasses as recited in claim 15 wherein said frame float pads and temple float pads further comprising a closed cell foam sponge with pressure sensitive adhesive backing.

17. The Floating eyeglasses as recited in claim 14 wherein said frame float pads closed cell foam sponge are from 4 millimeters to 7 millimeters thick and said temple float pads are closed cell foam sponge from 1 millimeter to 3 millimeters thick with said frame float pads and temple float pads are attached to the frame and temples with a contact cement on a primed surface.

18. Floating eyeglasses having a frame with a bridge with ends and a pair of optically clear lenses therein also a pair of side temples and hinges connecting said frame with each side temple in a pivotal manner comprising:
   a plurality of frame float pads attached to the frame adjacent to the hinges, and
   a temple float pad attached to each side temple such that the combined frame and temple float pads have sufficient buoyancy to overcome weight of the frame and temples permitting the eyeglasses to float in water.

19. The Floating eyeglasses as recited in claim 18 wherein said frame float pads and temple float pads further comprising a closed cell foam sponge with pressure sensitive adhesive backing.

20. The Floating eyeglasses as recited in claim 19 wherein said frame float pads closed cell foam sponge is from 4 millimeters to 7 millimeters thick and said temple float pads closed cell foam sponge is from 1 millimeter to 3 millimeters thick with said frame float pads and temple float pads are attached to the frame and temples with contact cement on a primed surface.

\* \* \* \* \*